US007463004B2

(12) United States Patent
Burnett

(10) Patent No.: US 7,463,004 B2
(45) Date of Patent: Dec. 9, 2008

(54) PLANETARY DUAL STEPPER DRIVES

(75) Inventor: Daniel H. Burnett, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 368 days.

(21) Appl. No.: 11/483,577

(22) Filed: Jul. 10, 2006

(65) Prior Publication Data

US 2008/0025770 A1 Jan. 31, 2008

(51) Int. Cl.
*G05B 19/40* (2006.01)
*B41J 17/02* (2006.01)

(52) U.S. Cl. ....................... 318/685; 318/696; 399/324; 400/545; 400/569

(58) Field of Classification Search ................. 318/685, 318/560, 561, 624, 696; 475/5, 339, 91, 475/31, 153; 101/216; 348/207; 600/112, 600/173; 400/569, 545; 399/227, 324; 60/39.281
See application file for complete search history.

(56) References Cited

U.S. PATENT DOCUMENTS 4,608,820 A * 9/1986 White et al. ............. 60/39.281
4,701,818 A * 10/1987 Gitzendanner ........... 360/264.5
4,728,987 A * 3/1988 Diola et al. ................. 399/227
4,867,000 A * 9/1989 Lentz .......................... 475/31
4,973,295 A * 11/1990 Lee ............................ 475/153
5,462,371 A * 10/1995 Beretta et al. ............... 400/569
5,762,603 A * 6/1998 Thompson .................. 600/112
5,988,319 A * 11/1999 Hudson et al. ............ 185/40 R
6,007,484 A * 12/1999 Thompson .................. 600/173
6,398,725 B1 * 6/2002 Thompson .................. 600/173
7,115,066 B1 * 10/2006 Lee ............................. 477/15
7,220,205 B2 * 5/2007 Nagai et al. .................... 475/91
7,223,199 B2 * 5/2007 Willmot et al. ............. 475/339
7,415,221 B2 * 8/2008 Parisi et al. ................. 399/107
2001/0052735 A1 * 12/2001 Sakamoto ................. 310/75 R
2002/0067411 A1 * 6/2002 Thompson et al. .......... 348/207
2004/0095037 A1 * 5/2004 Palmero ..................... 310/261
2005/0049107 A1 * 3/2005 Willmot et al. ............. 475/339
2006/0201352 A1 * 9/2006 Saito .......................... 101/216
2006/0205553 A1 * 9/2006 Lee ............................... 475/5

* cited by examiner

*Primary Examiner*—Paul Ip
(74) *Attorney, Agent, or Firm*—James J. Ralabate

(57) ABSTRACT

An electrostatic marking system is provided having a power source(s) in each of its processing stations. A specialized power source is made up of two stepper motors in operative connection to a planetary gearset. This gearset is comprised of a sun gear, a set of planet gears supported by a carrier, and a ring gear. This power source provides a continuously variable gear ratio between each stepper motor and its load.

8 Claims, 5 Drawing Sheets

PLANETARY DUAL STEPPER DRIVES

FIELD

This invention relates generally to an electrostatic marking system and, more specifically, to drive trains used in said marking systems.

BACKGROUND

In Xerography or an electrostatic marking system and process, a uniform electrostatic charge is placed upon a photoreceptor surface. The charged surface is then exposed to a light image of an original to selectively dissipate the charge to form a latent electrostatic image of the original. The latent image is developed by depositing finely divided and charged particles of toner upon the photoreceptor surface. The charged toner being electrostatically attached to the latent electrostatic image areas to create a visible replica of the original. The developed image is then usually transferred from the photoreceptor surface to a final support material, such as paper, and the toner image is fixed thereto to form a permanent record corresponding to the original.

In Xerographic copiers or printers, a photoreceptor surface is arranged to move in an endless path through the various processing stations of the xerographic process. Since the photoreceptor surface is reusable, the toner image is then transferred to a final support material, such as paper, and the surface of the photoreceptor is prepared to be used once again for the reproduction of a copy of an original. In this endless path, several Xerographic related processing stations are traversed by the photoconductive belt.

Each of these processing stations generally include a source of power usually a single motor to provide the necessary processing at that station. The term "power" as used throughout the disclosure and claims includes rotational torque. For example: a motor is needed to turn or rotate the fuser and pressure rollers in the fusing station; or similarly a motor is needed to move the photoconductor or transport the paper, etc. In addition, marking systems include stations that supply paper and others that perform functions on multiple sheets of paper or sets. These functions include stapling, binding, hole punching and many other specialized "finishing" operations. In these examples, a motor is often used to rotate a mechanism to a position needed for a variable function of that station. For example: a motor might be employed to move staplers in accordance with inputs provided by a customer, or a motor might move a mechanism that pushes the set to a new location and must change the amount of push based on the set size. Another type of example found in both paper supplying stations and finishing stations there is often a need to accelerate individual sheets away from those following to increase the time for subsequent operations. Generally, the motors used have one fixed speed ratio between the motor and the load, and the motors must be sized for all speed and load combinations. A fixed gear ratio sometimes can be made more versatile by the use of transmissions and clutches, but these transmissions and clutches generally are a source of unreliability and mechanical failure.

Thus, prior art motors generally are applied with a fixed non-adjustable ratio which is set by the geometry of the drive elements. There are cases where the ability to employ a variable ratio would allow a flexibility not found with fixed ratio systems.

Also, in electrophotographic or electrostatic marking systems, several motors of different sizes and capabilities are needed since the requirements at the various stations differ greatly. Therefore, a very large inventory of different size and types of motors are required to be kept. Many of these inventoried motors don't meet all of the requirements of the intended stations and either need to be modified or concessions on their use need to be considered. Any means to help reduce this very large inventory of motors would be desired both from an expense standpoint and a logistics standpoint.

The customary processing stations in an electrostatic marking system comprise a charging station, an exposure station, a development station, a transfer station, a detack station, a fusing station, a cleaning station, a paper supply station, paper transport stations, and finishing stations. By "customary" as used throughout this disclosure and claims will include the aforementioned stations. Each of these stations have unique needs such as speed of processing, amount of torque and type of control, etc. It is clear to imagine why so many different motors are needed to be inventoried to accommodate all of these various stations' needs.

Therefore, when designing drive trains for xerographic machines, there is often a compromise made between the requirements, such as gear ratio and the capability of the motor. As above noted, since transmissions and clutches are a source of unreliability, other convenient ways to achieve variable gear ratios are desired.

SUMMARY

The present embodiments provide the use of a planetary gearset where two elements of the gearbox are driven by two different stepper motors.

This invention provides a means to provide a continuously variable gear ratio between a stepper motor and its load. This is done by connecting the first stepper to one element of a planetary gear set. A second stepper is then connected to a second element of the planetary gear set. The gear ratio between the first and second motors and the output element is set by the relative speed at which those motors are operated. Different gear ratio ranges will be possible depending on which two elements (sun, carrier, or ring) of the planetary gearset is connected to the first and second steppers. One application in an embodiment would be to allow use of two smaller motors in place of one larger motor. This approach could permit, for example, a small stepper to accelerate a high inertia load and still operate at high top speed. One possible arrangement in one embodiment would be with the two stepper output shafts facing each other.

A planetary gearset generally comprises a sun gear, planet gears with associated carrier and ring gear. These components are all positioned in an operable manner and located within a gearbox. This invention provides ways to locate support bearings around a planetary gearbox to allow drive input from two steppers into two elements, such as the ring and sun gears, ring and carrier or sun and carrier. Although these bearing arrangements are sometimes difficult, they can be achieved with careful design. A hollow shaft motor was also considered which would allow for efficient axial packaging but would require special built motors. In one embodiment, the configuration of two motor output shafts pointing toward each other, allows use of standard motors and when one motor drives the carrier and the other drives the sun gear the output can be through a belt or other drive mechanism acted on by the ring gear. A computer model of the mechanism was built to exercise the idea, and it was found that a wide range of ratios can be achieved with two steppers driven with drivers routinely used in electrostatic machines. In checking this work, it was found that a formula does exist for the gear ratio: $F=1+(Z^*(1-S))/B$ where the revolutions of the follower or driven member per revolution of the driver. S=the revolutions of the secondary driver, per revolution of initial driver. S is negative when secondary and initial drivers rotate in opposite directions. Z is the diameter of the sun gear and B is the diameter of the ring gear.

What we see from this is that the term S depends on the relative speeds of the motors and allows for a ratio change. This means that a new element of control is found by using two motors since the ratio can be changed by simple motor commands. This could also be done while the motor is accelerating, during which flexibility in gear ratio would be a particular advantage.

Computer modeling of the mechanism also allowed a static torque check where two motors with a +200 N-mm torque on the carrier and the sun gear give an output torque of 90.6 N-mm. When one is reversed in torque the output becomes 287 N-mm. A similar speed check shows the following combinations of possible speeds (all in steps/sec.)

| | | | |
|---|---|---|---|
| Input Sun speed | −2000 | 100 | 1000 |
| Input Carrier speed | 100 | −2000 | −2000 |
| Output Ring speed | 590 | −2750 | −3060 |

By the use of two stepper motors and a planetary gear set with inputs to three separate elements (sun, carrier, and ring) many variations and permutations can be achieved. The large inventory of motors previously required can be drastically reduced since each power unit of two stepper motors with a planetary gearset can accomplish a wide variety of power requirements in one electrostatic machine. Greater speed and torque variations can be achieved with this power unit. Also, physical space and costs considerations can be satisfied with embodiments of the present invention. Obviously, the stepper motors can be the same or different configurations, as is their location visa-vis the planetary gearset, depending upon the need. A great flexibility is provided by the various embodiments of this invention. Various known circuit boards are used to control the functions of the two stepper motors. The driver circuitry on these boards can be made less expensive by reducing the electrical current required. This invention can allow using a less expensive electronic driver with two coupled motors running on low current than one motor running on higher current.

DETAILED DESCRIPTION OF DRAWINGS AND PREFERRED EMBODIMENTS

Figure 1:
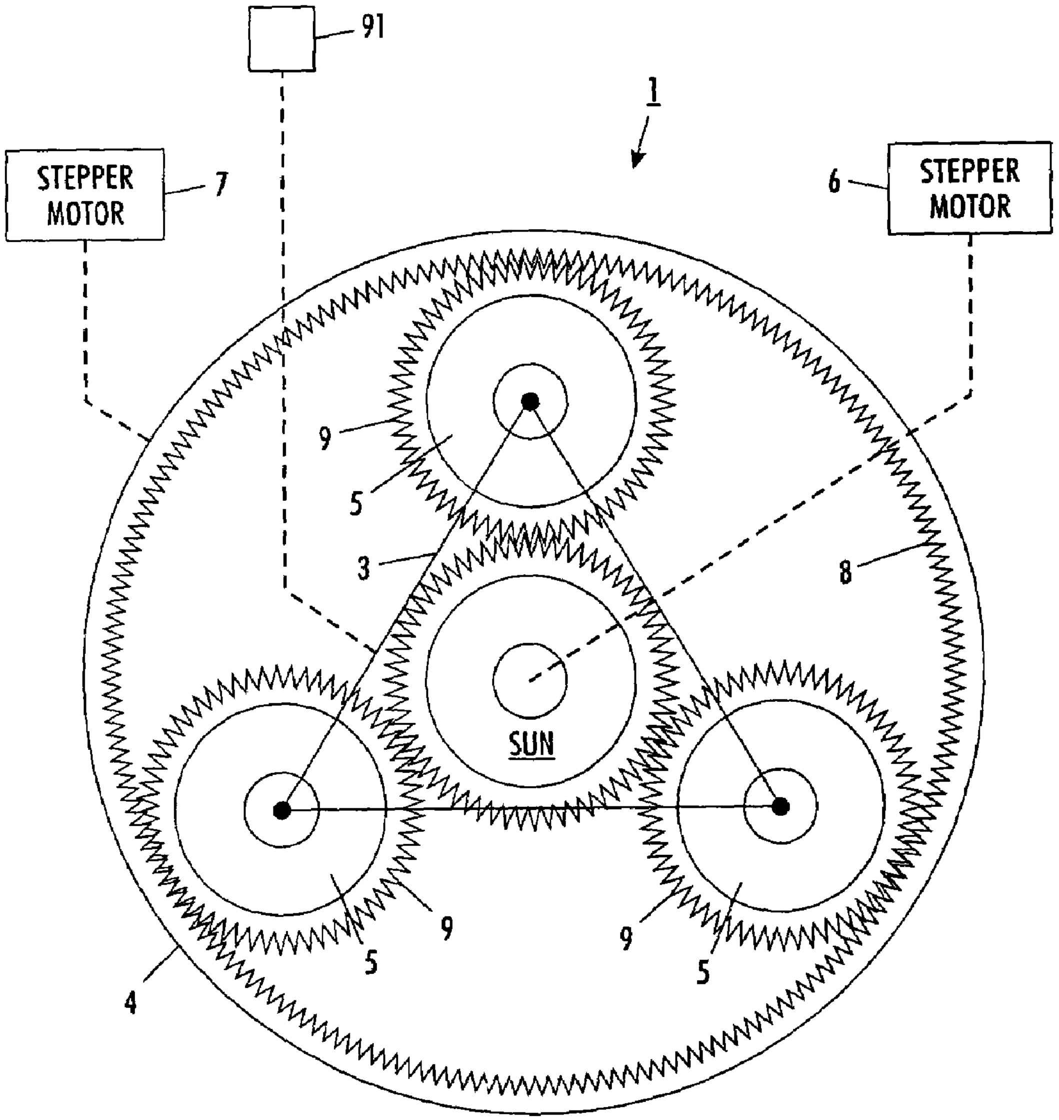
FIG. 1 illustrates a schematic of the planetary gearset or power unit useful in an embodiment of this invention.

In FIG. 1 an embodiment of the present invention is illustrated where a planetary gear set 1 is provided with a sun gear 2, a carrier 3, a ring gear 4 and planet gears 5. Each of these gears have teeth 8 and 9 around their entire circumference, the teeth 8 on the ring gear are internal teeth and the teeth 9 on the sun and planet gears are external teeth. A first stepper motor 6 is shown connected to sun gear 2 but may be connected to any of gears 2, 4 or the carrier 3. Also a second stepper motor 7 is shown connected to ring gear 4 but motor 7 may also be connected to gears 2, 4, or the carrier 3, provided it is different than motor 6 gear connection. The several variations of motors 6 and 7, mechanical connections to any of the gears 2, 4, and carrier 3 provide a continuous variable gear ratio between the power source and its load 91. Internal teeth 8 located around ring gear 4 and external teeth 9 located around gears 2 and 5, respectively, provide the mechanical interaction required.

Figure 2:
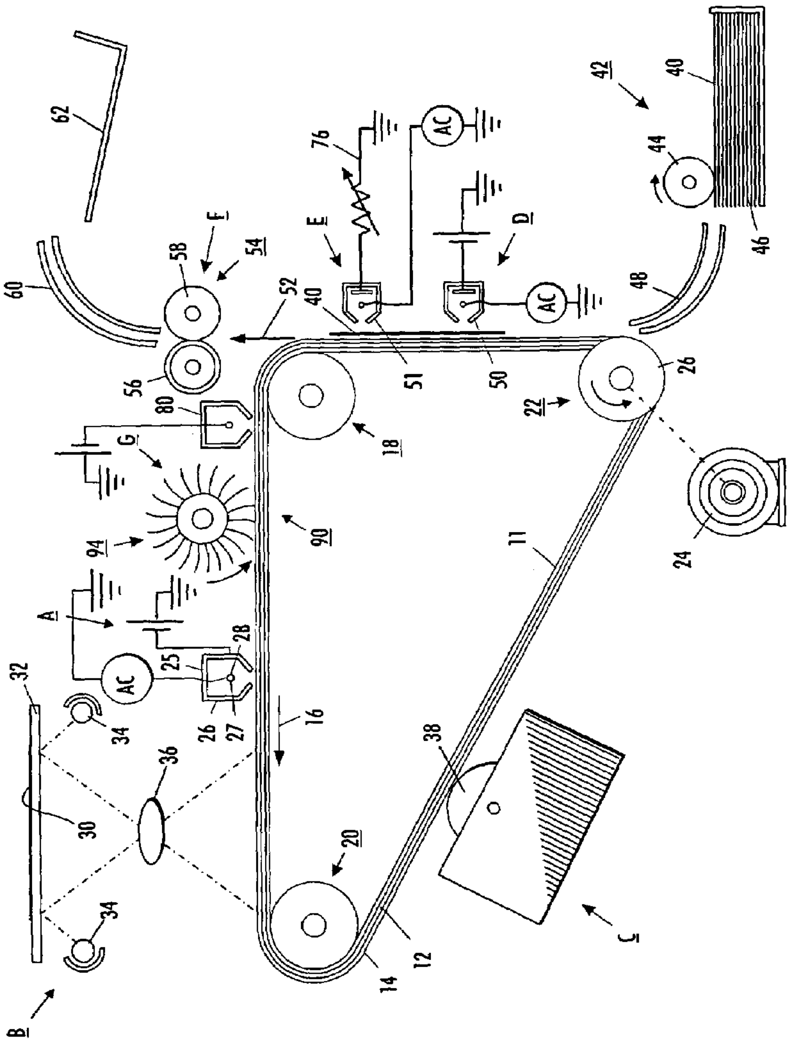
FIG. 2 illustrates a typical electrostatic marking system with various processing stations that would use the embodiment of present inventions.

In FIG. 2, a typical electrostatic marking system is shown where power sources are needed throughout the system, such as in each processing station A, B, C, D, E, F, and G. For clarity, the power sources in each station are not shown. The components of this Xerographic system are photoconductive belt 90, electrically conductive substrate 11, charge generator layer 92, photoconductive particles dispersed in electrically insulating organic resin 13, charge transport layer 14, directional arrow 16, stripping roller 18, tension roller 20, drive roller 22, motor 24, corona device 25, conductive shield 26, dicorotron electrode comprise of elongated bare wire 27, electrically insulating layer 28, original document 30, transparent platen 32, lamps 34, lens 36, brush developer roller 38, sheet of support material 40, sheet feeding apparatus 42, feed roll 44, stack 46, chute 48, corona generating device 50, detack corona generating device 51, directional arrow 52, fuser assembly 54 heated fuser roller 56, backup roller 58, fusing sheet 60, catch tray 62, resistor 76, diode 78, shield circuit of a pre-clean dicorotron 80, conventional cleaning brush 4 and developer sump 93. The following designate the various stations, as illustrated in FIG. 2 charging station A, exposure station B, development station C, transfer station D, detack station E, fusing station F and cleaning station G. Developer sump 93 contains both right sign and wrong sign toner and any additives. A conventional cleaning brush is shown at 94.

In FIG. 2 the electrostatic or Xerographic marking systems as illustrated depicts most components used. As noted, this system has several processing stations A, B, C, D, E, F, and G each station requiring at least one and often more than one power source where the power units of the present invention can be located.

Figure 3:
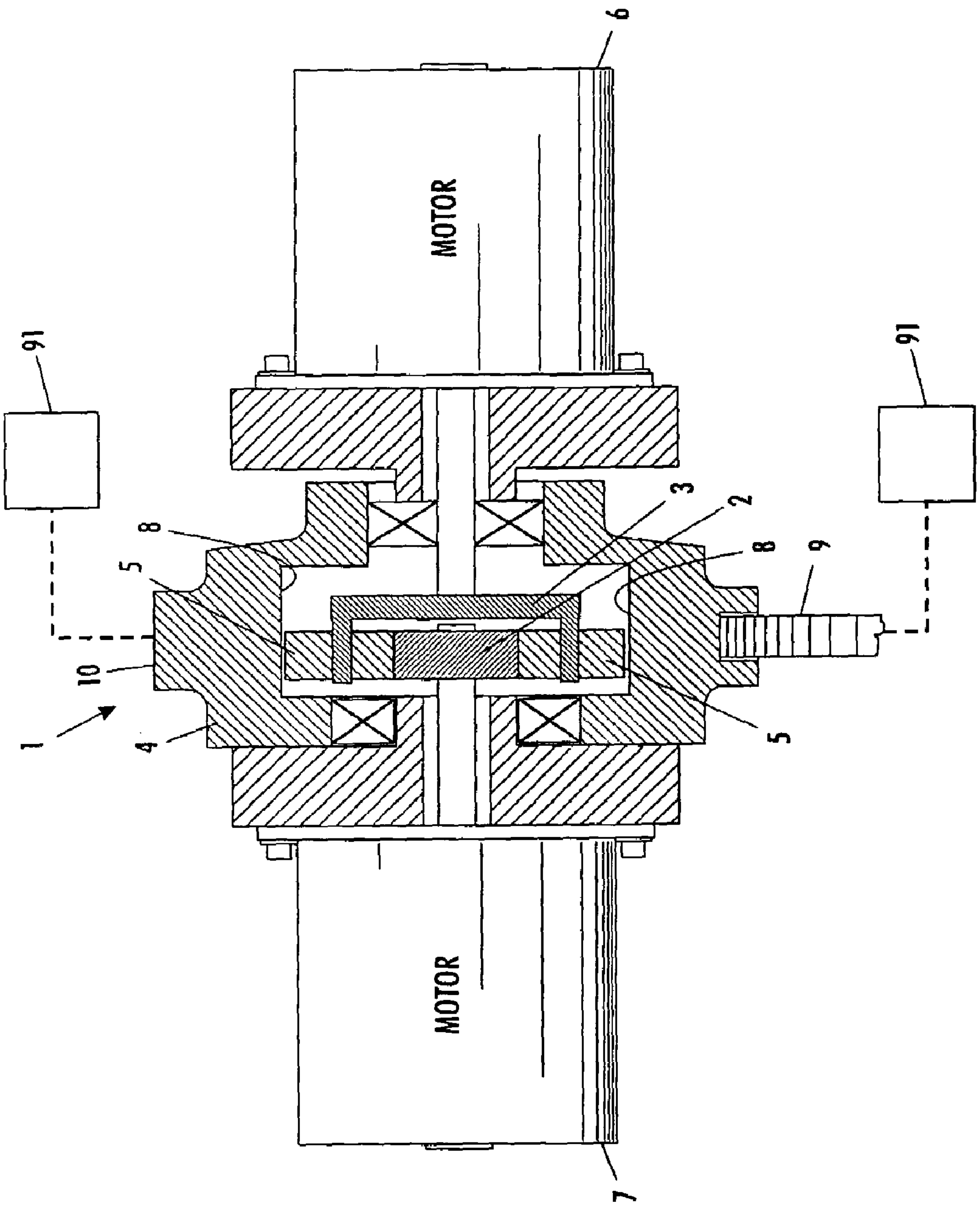
FIG. 3 illustrates a cutaway side view of a first embodiment of the stepper motors-planetary gearset operative connection.

FIG. 3 shows sun and planet gears input and ring gear output. Torque enters planetary gearset 1 from left motor 7 through sun gear 2, and through the carrier 3 to the planet gears 5 from the right motor 6. Output is from the ring gear 4 which would have internal teeth 8 to mesh with planet gears 5. Load 91 is driven by the ring gear 4 via a belt 9 or external gear teeth 10 on the ring gear 4.

Figure 4:
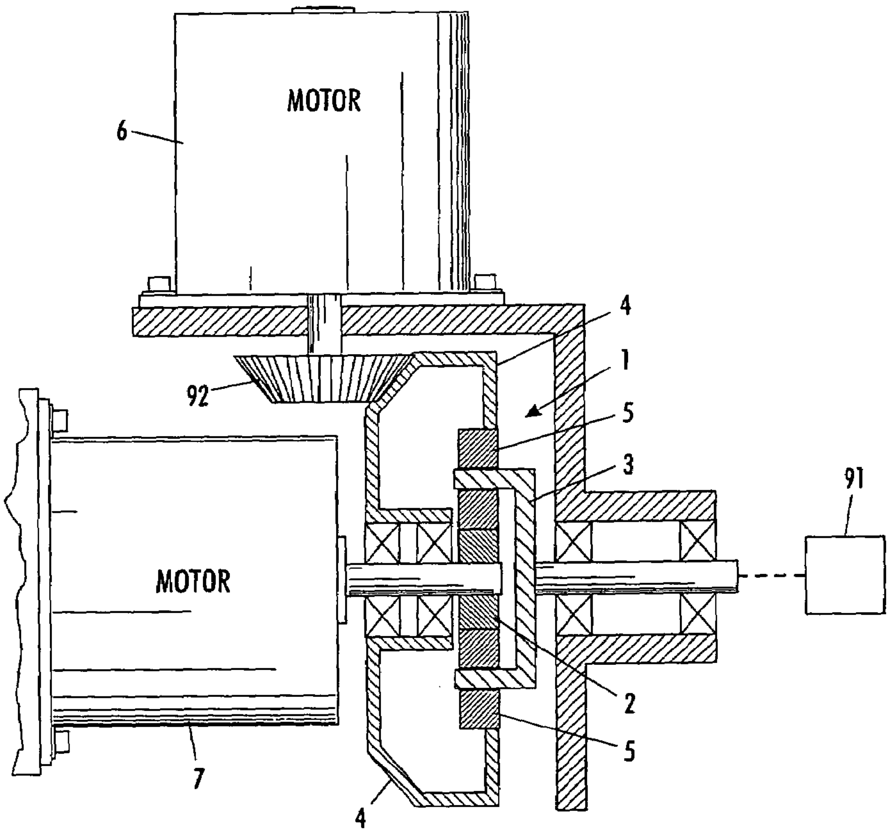
FIG. 4 illustrates a cutaway side view of a second embodiment of the stepper motors-planetary gearset operative connection.

FIG. 4 illustrates ring and sun gear input and planet gears/carrier output. In this version the top motor 6 drives the ring gear 4 through a bevel gear 92 while the lower motor 7 drives the sun gear 2. Load 91 is driven by the carrier 3 via the planet gears 5.

Figure 5:
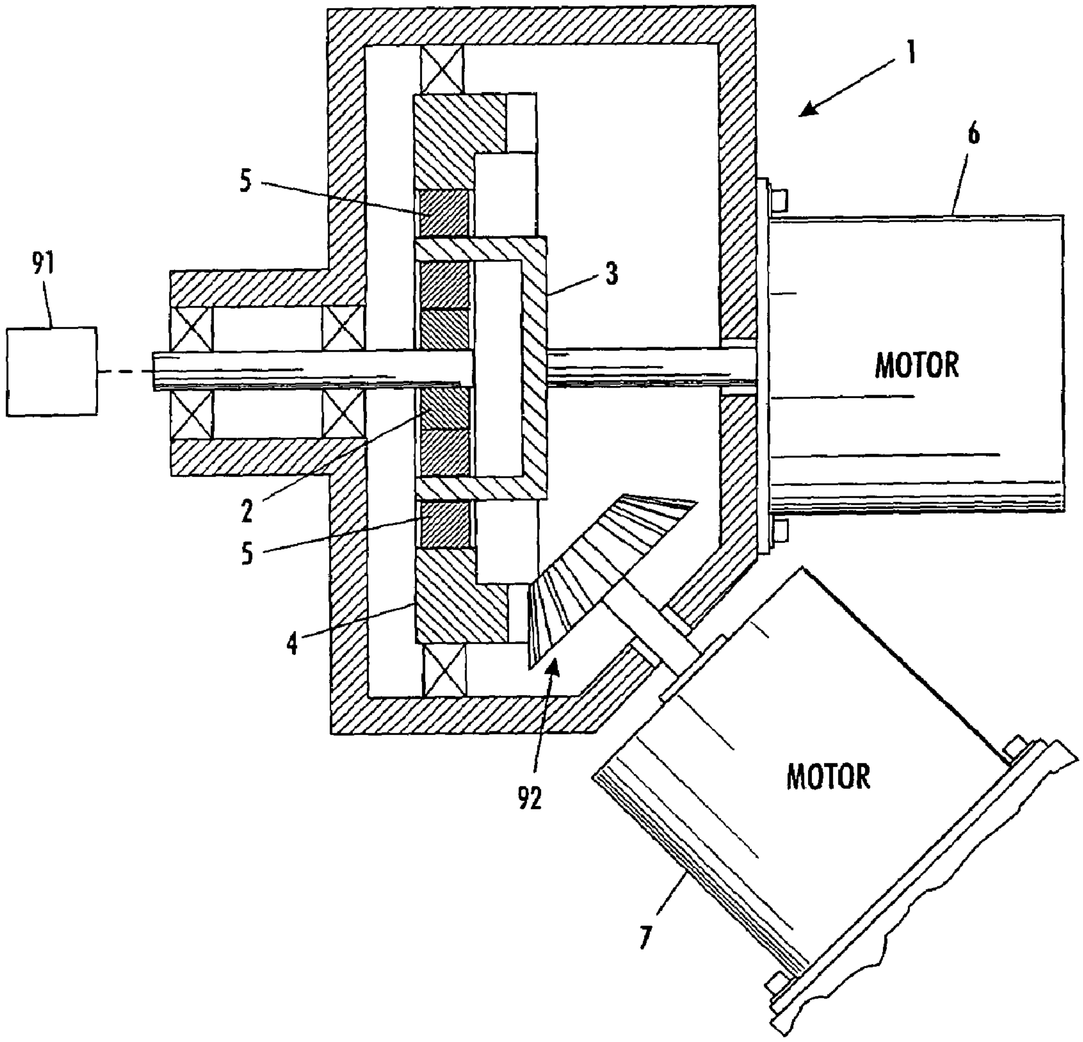
FIG. 5 illustrates a cutaway side view of a third embodiment of the stepper motors-planetary gearset operative connection.

FIG. 5 illustrates ring-planet gears/carrier input and sun gear output. In this version, the lower motor 7 drives the ring gear 4 via a bevel gear 92 while the planet 5/carrier 3 is driven by the other motor 6. Load 91 is driven by the sun gear 2.

While the present system has been defined above relative to electrostatic marking systems, it can equally be used in suitable paper handling, finishing and feeding systems. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An electrostatic marking system comprising processing stations operatively arranged with each other, said processing stations comprising:

a charging station, an exposure station, a development station, a transfer station, a fusing station and a paper transport station, each of said stations comprising a source of power, including at least two stepper motors operatively connected to at least one planetary gearset, and wherein one element of said gearset is driven by a first of said stepper motors and another element of said gearset is driven by a second of said stepper motors, and wherein said planetary gearset comprises a sun gear, a carrier with at least one planet gear, and a ring gear, said sun gear in direct contact with said at least one planet gear, said source of power enabled to provide a continuous variable gear ratio between said stepper motors and the driven loads, and wherein said source of power is adapted to provide different gear ratio ranges, depending upon which of said gears in said gearset is connected to said first and said second stepper motor, said ring gear comprising internal ring gear teeth around its entire inner circumference, said at least one planet gear having external planet teeth located around their entire external circumference.

2. The system of claim 1 wherein said two stepper motors have output shafts facing each other, said internal ring gear teeth and said external planet teeth configured to mesh together to provide thereby a mechanical interaction required.

3. The system of claim 1 wherein one output is conveyed through a belt or other drive mechanism acted on by one of said gears.

4. The system of claim 1 wherein said second stepper motor is enabled to be controlled to modulate a gear ratio between said first stepper and its load.

5. The system of claim 1 wherein said two stepper motors have output shafts positioned at an angle to each other.

6. The system of claim 1 wherein said source of power is enabled to provide a plurality of torques and speeds to its loads.

7. The system of claim 1 wherein said power source is enabled to provide an output conveyed via a belt or other drive mechanisms operatively connected to at least one element in said gearset.

8. The system of claim 1 wherein said stepper motors are controlled by a circuit board.

* * * * *